May 12, 1964
M. O. HOLTAN
3,132,537
SPEED CHARGING POWER TRANSMISSION
Filed March 30, 1962
3 Sheets-Sheet 1
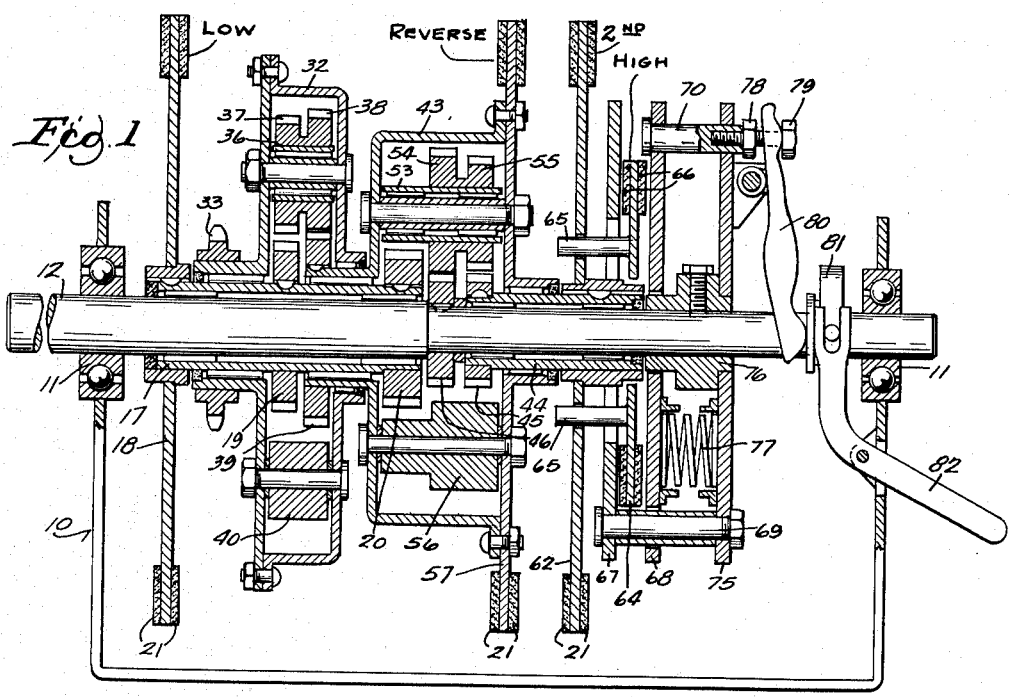
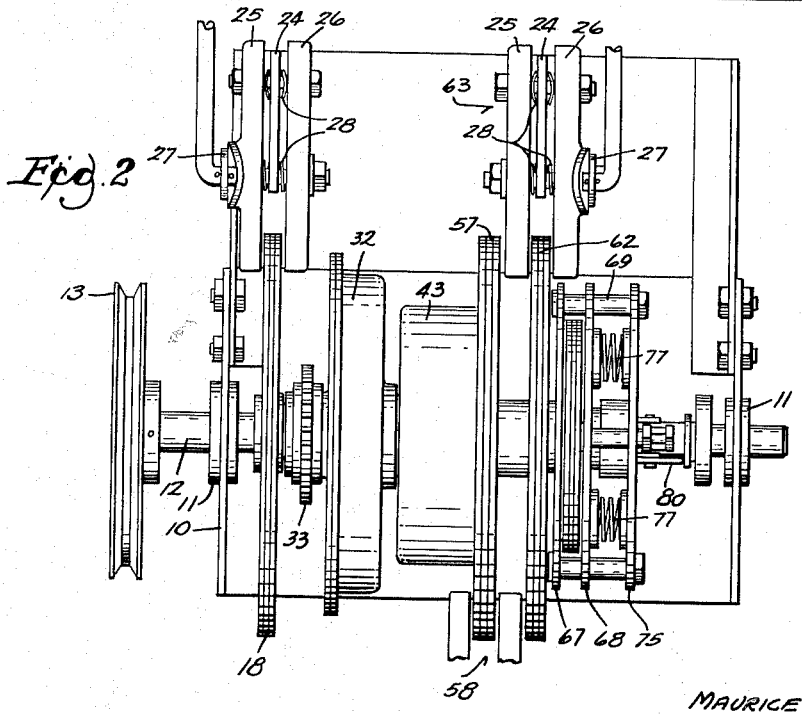
INVENTOR.
MAURICE O. HOLTAN
BY
Miles Henninger
ATTORNEY May 12, 1964 M. O. HOLTAN 3,132,537
SPEED CHARGING POWER TRANSMISSION
Filed March 30, 1962 3 Sheets-Sheet 2

INVENTOR.
MAURICE O. HOLTAN
BY Miles Henninger
ATTORNEY

May 12, 1964

M. O. HOLTAN 3,132,537

SPEED CHARGING POWER TRANSMISSION

Filed March 30, 1962

INVENTOR.
MAURICE O. HOLTAN
BY
*Miles Henninger*
ATTORNEY

United States Patent Office 3,132,537
Patented May 12, 1964

3,132,537
SPEED CHANGING POWER TRANSMISSION
Maurice O. Holtan, 2012 Menomonee Parkway,
Wauwatosa 13, Wis.
Filed Mar. 30, 1962, Ser. No. 183,801
5 Claims. (Cl. 74—763)

This invention relates to improvements in speed changing power transmissions and particularly to a transmission in which the gearing is continuously in mesh and speed changing can be done at any time.

A number of small vehicles, tractors and power units, have been developed in which there is need for small and inexpensive speed change transmissions which will operate without requiring a clutch, which can be shifted from one speed to another and from forward to reverse and from reverse to forward without shock and with smooth flow of power. If the gears are constantly in mesh and available for power flow in various paths without waiting for previously operating gear trains to come to rest, the power flow can be controlled by a shifting lever that may be moved slowly from neutral to low, to second, to high or to reverse, so that the power can be "feathered" or smoothly engaged. Even completely unskilled persons can operate a vehicle with such transmission.

In the present device, the power input shaft has a driving gear which meshes with a driven gear forming part of a planet gear assembly of one of two planetary gear sets. Sleeves rotatable on the input shaft extend from the driving gear toward the shaft ends and have the sun gears of the planetary gear sets fixed thereon, the sleeves rotatably supporting the housings of the gear sets which rotatably carry the planet gear assemblies meshing with the sun gears. One sleeve carries a sun gear of each set and the other sleeve carries a sun gear of a second gear set while the housing of the second gear set carries a sun gear of a first gear set. Hence the two gear sets coact in series to deliver power to a sprocket on the one gear set housing, in the first embodiment of the invention. In the second embodiment of the invention, the device is provided with an output shaft and the gearing is accordingly somewhat differently arranged but comprises the same elements as above mentioned, which act in the same way in both structures. Speed changing is accomplished by gripping one of several disks with friction facings whereby one or two gears, and in the case of reverse, one of the rotatable housings, are held stationary. The path of power flow from the input to the output member is obviously different depending on which of several disks is gripped and accordingly brings into effect different pairs of gears. All of the forward speeds are obtained by allowing both housings to rotate and by holding one or more of the gears, while reverse speed is obtained by holding one of the housings stationary and allowing all but one of the gears to rotate.

In the drawings:

FIG. 1 is a vertical cross sectional view on substantially a central plane, of one embodiment of the invention;

FIG. 2 is a top plan view of the structure shown in FIG. 1;

Figure 7:
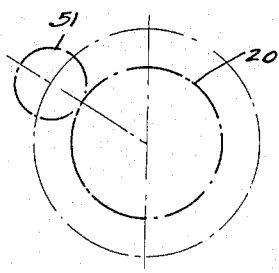
Figure 8:
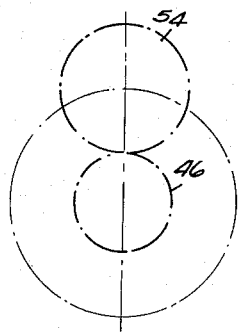
Figure 9:
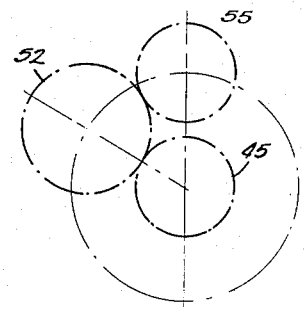
Figure 10:
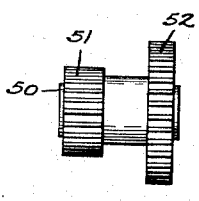
Figure 11:
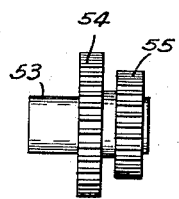
Figures 12, 13:
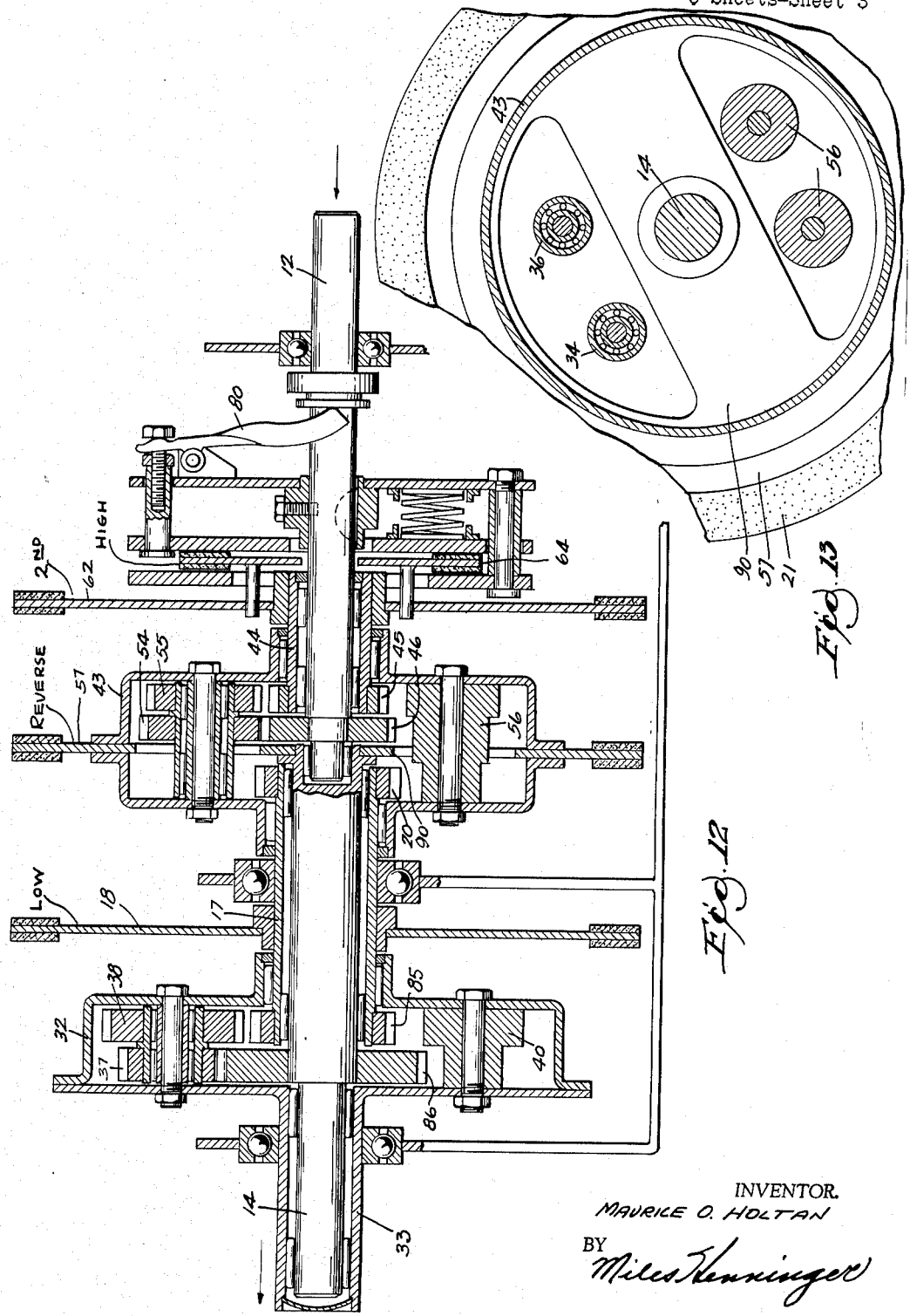

FIGS. 7, 8 and 9 each include a diagram showing the relationship of three trains of gears in another set of planetary gearing;

FIGS. 10 and 11 are elevational views of the planet gears involved in the diagrams of FIGS. 7, 8 and 9;

FIG. 12 is a vertical cross sectional view on substantially a central plane, of a modification of the present invention, and FIG. 13 is a fragmentary elevation of a connection between a gear housing and the input shaft as shown in FIG. 12.

Referring in detail to the drawing, numeral 10 designates a cradle or mounting in which are placed bearings 11 rotatably supporting a shaft 12 to which power is supplied as by a pulley 13 (see FIG. 2). Toward the left hand end of FIG. 1, a first sleeve 17 is rotatably mounted on the shaft and has fixed thereto a disk 18, a gear 19 and a gear 20. The disk 18 has friction facings 21 thereon to be engaged by a friction plate structure or brake (see FIG. 2) comprising a bracket 24 extending from the cradle 10 and on which are mounted two plates 25, 26 movable toward one another to engage the friction facings 21 on the disk 18 when a cam lever 27 is turned to bring the plates 25, 26 together against the action of compression springs 28.

Figure 3:
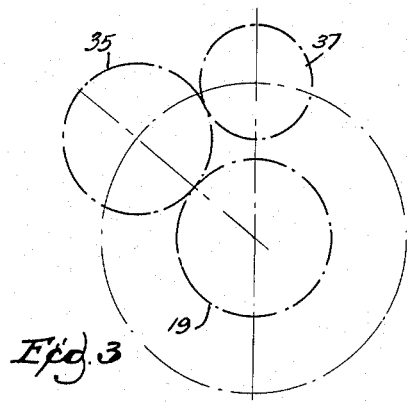
FIG. 3 is a diagram showing the relationships of one portion of one set of planetary gearing.
Figure 4:
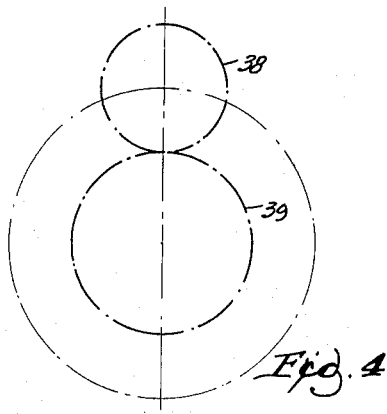
FIG. 4 is a view similar to FIG. 3 but showing other relationships in the one set of gearing.
Figure 5:
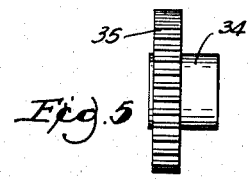
FIGS. 5 and 6 are elevational views of the planet gears indicated in the diagrams of FIG. 3 and FIG. 4.
Figure 6:
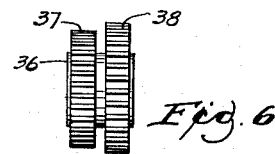

A first housing 32 is rotatably mounted at one side on sleeve 17 by way of roller bearings (and otherwise as will be described) and has fixed thereto sprocket 33 which is the power output member of the device. Within the housing 32 are mounted two planet gear assemblies comprising hub 34 and gear 35 as shown in FIG. 5 and hub 36 with gears 37 and 38 as shown in FIG. 6. The planet asemblies rotate about sun gears 19 and 39, the planet gear 35 meshing with sun gear 19 and with planet gear 37 as shown in FIG. 3. Gear 38 of the planet assembly 36—37—38 meshes with the sun gear 39 which is mounted on a sleeve-like extension from the left hand side of a second housing 43 rotatably mounted on sleeve 17 by way of bearings, the right hand side of first housing 32 being rotatably mounted by way of bearings on an extension of the second housing. A weight 40 is mounted in the housing 32 to counterbalance the two planet assemblies identified above.

A second sleeve 44 is rotatably mounted on the shaft 12 toward its right hand end and has fixed thereon sun gear 45 of a second planetary gearing. A driving gear 46 is fixed on the shaft 12 adjacent the sun gear 45. Gears 20, 45 and 46 are all within the second housing 43 and gears 20 and 45 are sun gears for two planet gear assemblies of the second planetary gear set. One planet assembly comprises hub 50 and gears 51 and 52 while the other planet assembly comprises hub 53 and gears 54 and 55 shown in FIGS. 10 and 11 respectively. Referring to FIGS. 7, 8 and 9, it will be seen that sun gear 20 meshes with planet gear 51, sun gear 45 meshes with planet gear 52 which meshes with planet 55, and driving gear 46 meshes with driven gear 54 so that the driven and driving gears have sun and planet action. A weight (or weights) 56 is rotatably mounted in the housing 43 to counterbalance the above two planet gear assemblies. It will be seen that the second housing 43 has a portion formed as a disk 57 with friction facings 21 to be gripped by a brake device 58 such as was described above.

The second sleeve 44 has fixed thereto a third disk 62 which also has friction facings 21 for engagement by a third brake device 63 as previously described. Disk 62 may also be clutched to the shaft 12, the clutch including a plate 64 with pins 65 extending through the disk 62 and the disk is provided with friction facing 66. The clutch facings 66 are engageable by plates 67, 68 which are movable axially of the shaft and are respectively supported on pins 69 and 70. Pins 69, 70 extend from the plate 75 which is attached to hub 76 on the shaft 12. Springs 77 press the plate 68 away from the plate 75. Plate 67 bears on the heads of pins 69 and plate 68 moves toward plate 67 when the pins 70 and the plate 68 are released by the clutch operating device.

The clutch operating device includes extensions of a number of pins 70 with spaced nuts 78, 79 thereon to receive an end of lever 80 having its fulcrum on plate 75. The lever 80 is operable to bear against the nut 79 when pressure is put on the end of the lever by a collar 81 slidable on the shaft 12. There are three each of springs 77, pins 69 and pins 70 and levers 80, operating around the shaft to move clutch plate 64—68 axially of the shaft 12. The collar 81 is engaged by lever 82 having its fulcrum mounted on the cradle 10 and extends to a location where the lever 82 can be operated by the driver of the vehicle. Disk-brake 18, 24—28 is used for low speed forward, disk-brake 62—63 is used for second speed forward, clutch 64—82 is used for high speed forward and disk-brake 57, 58 is used for reverse.

For test purposes, a model of the structure of FIGS. 1–11 was provided with the following gearing:

| First planetary gear | Number of teeth | Second planetary gear | Number of teeth |
| --- | --- | --- | --- |
| 19 | 21 | 20 | 24 |
| 35 | 19 | 45 | 16 |
| 37 | 14 | 46 | 16 |
| 38 | 16 | 51 | 12 |
| 39 | 24 | 52 | 20 |
|  |  | 54 | 20 |
|  |  | 55 | 16 |

When the shaft 12 and driving gear 46 thereon are operated at 1000 r.p.m. and high forward speed is required, the clutch 64—82 is engaged to hold disk 62, sleeve 44 and sun gear 45 connected to the shaft 12. The gear train between gears 46 and 45 is 46—54—55—52—45 (see FIGS. 7–11) and the sizes of the gears are $$16/20 \times 16/20 \times 20/16 = 4/5 \text{ or } 1.25:1 \text{ or } 2.25:1$$

ratio in opposite direction. With both gears 46 and 45 rotating 1000 r.p.m. the tooth ratios are incompatible and cannot function and will lock all of the above gears and the gear carrier housing 43 together so that they all rotate around shaft 12 at 1000 r.p.m. Sun gear 20 in housing 43 is connected by sleeve 17 to sun gear 19 in housing 32 and housing 43 is connected by its left hand extension to sun gear 39 in housing 32. The gear train between gears 19 and 39 is 19—35—37—38—39 (see FIGS. 3–6) and the tooth ratios of the gears are $$21/19 \times 19/14 \times 16/24 = 1/1 \text{ or } 1:1$$

ratio in the opposite direction. This gear train is also then locked and all such gearing and the carrier housing 32 rotate together around and with shaft 12 at 1000 r.p.m. and, as output sprocket 33 is fastened to housing 32, it is rotating at 1000 r.p.m. Hence there is no reduction in speed and high speed forward is equal to the input speed and the ratio is 1:1.

When the input speed is 1000 r.p.m. and second (intermediate) speed forward is required, the disk 62 is now gripped by brake 63 and held against rotation to hold sleeve 44 and gear 45 and the gearing associated therewith acts as a planetary. Shaft 12 rotates gear 46 at 1000 r.p.m. and the primary planetary gear train is activated to include pairs of gears 46—54, 55—52, 52—45 (see FIGS. 7–11) and the speed is determined as follows:

$$1000 \times 16/20 \times 16/20 \times 20/16 = 800$$

or 1.25:1=2.25:1 at 445 r.p.m. for housing 43. The secondary gear train is also now acting as a planetary and includes gears 39—38, 37—35, 35—19 (see FIGS. 3–6) and the speed is determined as follows:

$$445 \times 24/16 \times 14/19 \times 19/21 = 445$$

or 1:1=2:1 at 222 r.p.m. for the speed of housing 32, except for the effect of the low power portion of the first train. The low power train portion is not being braked but gear 20 would be idling or turning freely if it were not connected to the primary gear train. But gear 20 is connected to gear 19 so that its idling rotation also affects the net result of the speed of the secondary gear train. This additional gearing power train is 45—52, 51—20 and the speed is determined as follows:

$$445 \times 16/20 \times 12/24 = 178$$

minus 445=267 r.p.m. The next power train is 19—35, 35—37, 38—39 and the speed is determined as follows:

$$267 \times 21/19 \times 19/14 \times 16/24 = 267$$

or 1:1 equals 2:1 or 133 r.p.m. for the speed of housing 32. This speed is added to the speed of the other power flow which is 222, which added to 133 r.p.m. equals 355 r.p.m. as the speed of output sprocket 33 when in second speed (2.80:1 ratio).

When the input speed is 1000 r.p.m. and a low forward speed is required, the disk 18 is gripped by brake 24—28 to hold the secondary train gear 19 and the primary train gear 20 against rotation. Driving gear 46 rotates at 1000 r.p.m. and the primary gearing train which is acting as a planetary, includes pairs of gears 46—54, 55—52, 51—20 and the speed is determined as follows:

$$1000 \times 16/20 \times 16/20 \times 12/24 = 320$$

or 3.1:1 which is 4.1:1 at 242 r.p.m. for housing 43. The secondary gear train is also acting as a planetary with gear 19 not rotating includes gears 39—38, 37—35, 35—19 and the speed is determined as follows:

$$242 \times 24/16 \times 14/19 \times 19/21 = 242$$

or 1:1 which is 2:1 and the speed of the output sprocket 33 is 121 r.p.m. when in low speed (8.2:1 ratio).

When the input speed is 1000 r.p.m. and direction of rotation of the output sprocket 33 is to be reversed and is to be at reduced speed, disk 57 is held against rotation by brake 58 and holds primary planet hub 50 with gears 51, 52 and hub 53 with gears 54, 55 against rotation about their respective sun gears. Driving gear 46 rotates at 1000 r.p.m. and engages gear 54 which acts through gear 55 to drive gears 52 and 51 and gear 20 (now acting as simple gearing). The primary gearing pairs are therefore 46—54, 55—52 and 51—20. The speed is determined as follows:

$$1000 \times 16/20 \times 16/20 \times 12/24 \text{ equals } 320 \text{ r.p.m.}$$

as the speed of sleeve 17. The secondary gear train is now acting as a planetary with gear 39 not rotating and gears 19—35, 35—37, 38—39 acting and the speed is determined as follows:

$$320 \times 21/19 \times 19/14 \times 16/24 \text{ equals } 320$$

or 1:1 which is 2:1 in reverse direction or 160 r.p.m. as the speed of the output sprocket 33, in the reverse direction from that of input shaft 12 (ratio 6.2:1).

The structure shown in FIGS. 12 and 13 is similar to that described above except that the shaft is now divided into two parts and the gears are somewhat differently arranged and mounted. The present structure also produces three speeds forward and one speed reverse but power is supplied at one end of the shaft and taken off a sleeve at the other end of the shaft. The input shaft is again designated 12 and the output sleeve is designated 33. The primary gears in the present instance are located similarly to the primary gears described above and are similarly mounted on the input shaft 12 or on the sleeves as described above and the same numerals are applied to such parts. In the secondary gearing however the sun gears 85, 86 are substantially different in size and are reversed axially of the shaft so that gears 38 and 86 are at the left hand of housing 32 while gears 35, 37 and 85 are at the right hand, thus reversing positions from those shown in FIGS. 3 and 4.

In the present embodiment the gears have teeth as follows:

| Primary gear set | Gearing teeth | Secondary gear set | Gearing teeth |
|---|---|---|---|
| 20 | 20 | 35 | 16 |
| 45 | 16 | 37 | 16 |
| 46 | 18 | 38 | 12 |
| 51 | 16 | 85 | 16 |
| 52 | 20 | 86 | 24 |
| 54 | 18 | | |
| 55 | 16 | | |

Hence the speeds obtained at input speed of 1000 r.p.m. are now as follows:

| | | |
|---|---|---|
| High forward | 1,000 r.p.m. | 1:1 |
| 2nd forward | 560 r.p.m. | 1.78:1 |
| Low forward | 392 r.p.m. | 2.56:1 |
| Reverse | 212 r.p.m. | 4.7:1 |

The operation of the present embodiment is similar to that described above so far as operation of the clutch and brake disks are concerned. For high forward speed, clutch 64—82 is operated to engage disk 62 and connect it to the shaft. Both housings 32 and 43 are rotated at 1000 r.p.m., the gear train involved including pairs of gears 46—54, 55—52, 52—45 both gears 46 and 45 turning at 1000 r.p.m. in the same direction and the gear ratio of the said gears, 18/18×16/20×20/16 equals 1:1, in the opposite direction causes all the gears to lock in a fixed position so that the carrier housing 43 rotates and in the same direction as input shaft 12 (at 1000 r.p.m.). Carrier housing 43 is connected to shaft 14 by means of disk 90. Therefore shaft 14 and gear 86 are rotating at 1000 r.p.m. as well as gear 85 which is connected to gear 20 by means of sleeve 17. The secondary gear train is 86—38, 37—35, 35—85 with both gears 86 and 85 turning at the same speed and in the same direction. The tooth ratios 24/12×16/16×16/16 equals 1:2 in opposite direction and causes all the gears to lock in a fixed position. Hence the carrier housing 32 and output sleeve 33 rotate at 1000 r.p.m. in the same direction as input shaft 12 (ratio 1:1).

For second speed forward, brake disk 62 is engaged to hold sleeve 44 and gear 45 against rotation and power flows through gears 46—54, 55—52, 52—45 in the primary planetary gearing rotating about gear 45. The speed of the primary gearing is 1000×18/18×16/20×20/16 equals 1000 r.p.m.

or 1:1 which becomes 2:1 in the planetary action or 500 r.p.m. for carrier housing 43 and shaft 14. Gears 86—38, 37—35, 35—85 in the secondary planetary gearing rotate about gear 85 which is turning slower than gear 86 but in the same direction. The speed of the secondary gearing would be 500×24/12×16/16×16/16=1000 or 1:2 which is 1:1 at 500 r.p.m. for carrier housing 32 if gear 85 were in a fixed position. However, gear 85 is also turning as a part of another power flow namely: 45—52, 51—20 in the primary gearing and 85—35, 35—37, 38—86 in the secondary gearing. The speed of the primary gearing is 500×16/20×16/20 equals 320 minus 500 equals 180 r.p.m. The speed of the secondary gearing is 180×16/16×16/16×12/24 equals 90 or 2:1 which is 3:1 or 60 r.p.m. for the carrier housing 32 in the same direction. Thus housing 32 and output sleeve 33 rotate a total of 500 plus 60 or 560 r.p.m. in the same direction as input shaft 12 (ratio 1.78:1).

For low speed forward, disk 18 is gripped to hold gears 20 and 85 against rotation. The gear train now involved includes gears 46—54, 55—52 and 51—20 in the primary gearing and 85—35, 35—37 and 38—86 in the secondary gearing so that the speed is reduced as shown above. In the primary gearing, gear 20 is fixed and the planet gears and carrier housing 43 rotate about it turning shaft 14 and gear 86. In the secondary gearing, gear 85 is fixed and the planet gears and carrier housing 32 rotate about it turning the output sleeve 33. The speed of the primary gearing is 1000×18/18×16/20×16/20 equals 640 or 1.56:1 which is 2.56:1 or 392 r.p.m. The speed of the secondary gearing is 392×24/12×16/16×16/16 equals 784 or 1:2 which is 1:1 or 392 r.p.m. in the same direction as input shaft 12 (ratio 2.56:1).

For reverse rotation of the output sleeve 33, disk 57 is engaged to hold housing 43 against rotation. Power is then transmitted by way of gearing 46—54, 55—52, 51—20 in the primary gearing and 85—35, 35—37 and 38—86 in the secondary gearing. Housing 32 now rotates in the reverse direction from that previously described and at the speed reduction noted above. In the primary gearing the housing 43 is fixed and the gears reduce speed and change direction by simple gearing. In the secondary gearing which is acting as a planetary, gear 86 is fixed as it is connected to shaft 14, and housing 43 and the planet gears and the carrier housing 32 rotate about it turning the output tube 33. The speed of the primary gearing is: 1000×18/18×16/20×16/20 equals 640 r.p.m. The speed of the secondary gearing is 640× 16/16×16/16×12/24 equals 320 or 2:1 which is 3:1 or 212 r.p.m. in the opposite direction as the input shaft 12 (ratio 4.70:1).

FIG. 13 shows how carrier 90 mounted on shaft 14 extends between the two parts of housing 43 and appears outside of the housing as disk 57. The carrier 90 is formed with apertures for the planet gear sets and the counterweights 56.

It will be seen that the present invention provides two planetary gear sets which coact in producing changes in speed and direction of rotation of an output member. The gear sets are interconnected by way of one of the sun gears of each set, and by way of the housing of one set and a sun gear of the other set. In both gear sets, the two sun gears of each set and the housings of each set are rotatable and the planet gears of each set are rotatable in and with the housings. To secure low and intermediate forward speeds and reverse, means are provided for selectively holding against rotation a sun gear of each set, a sun gear of one set or a housing of one set respectively. For high speed forward operation, a sun gear of one set is connected directly to the input shaft. Power input is by way of a driving gear meshing with a driven gear on the planet assemblies of one gear set. The gears are all in mesh and no time need be allowed for a prior gear train to stop rotating before engagement of another gear train. In both instances the output member is a sleeve connected with the housing of the secondary gear train.

I claim:

1. A speed changing transmission comprising an input shaft, a gear fixed on and driven by the shaft, plural sleeves separately and rotatably mounted on the shaft and severally extending from adjacent the driven gear, two planetary speed reducing gearing assemblies on and rotatable relative to the sleeves and each including a housing and plural sets of pinions rotatable in and with the housing and plural sun gears severally meshing with one of the pinions, the driven gear meshing with one of the pinions in one of the planetary assemblies, one sun gear of each of the two planetary assemblies being severally fixed on one of the sleeves, one sun gear of one of the planetary assemblies being fixed on another of the sleeves, one sun gear of one of the planetary assemblies being fixed on the housing of the other planetary assembly, the two sun gears on the sleeve and the sun gear on the planetary housing connecting the two planetary assemblies for power flow in series therethrough, power output means mounted on the planetary housing last in the series of connected planetary assemblies, a plurality of brakes mounted severally on the sleeves and on the planetary housing bearing one of the sun gears for selective actuation in securing different forward speeds and reverse speed, the planetary sub-assemblies and the brakes being exposed and separated for air cooling and individual adjustment.

2. The speed changing transmission of claim 1 in which one of the said brakes is mounted on the sleeve having two sun gears thereon and actuation of such brake holds both said sun gears stationary to produce maximum reduction in forward speed.

3. The speed changing transmission of claim 1 in which one of the said brakes is mounted on the sleeve having one sun gear thereon and actuation of such brake holds said one sun gear stationary to produce intermediate reduction in forward speed.

4. The speed changing transmission of claim 1 in which one of the said brakes mounted on the one planetary housing is actuatable to hold stationary the sun gear on said housing for reversing direction of rotation of output means on the other planetary housing.

5. The speed changing transmission of claim 1 in which a clutch mounted on the input shaft is actuatable to connect the said one of the brakes on the sleeve bearing one sun gear with the input shaft for locking the sun gear to the input shaft whereby the planetary housings are driven at substantially the speed of the input shaft.

References Cited in the file of this patent

UNITED STATES PATENTS

| | | |
|---|---|---|
| 743,467 | Decker | Nov. 10, 1903 |
| 2,845,818 | Siljander | Aug. 5, 1958 |
| 2,923,178 | Miller | Feb. 2, 1960 |

FOREIGN PATENTS

| | | |
|---|---|---|
| 7,116 | Great Britain | Mar. 24, 1906 |
| 14,114 | Great Britain | June 19, 1907 |